United States Patent [19]

Mannhardt

[11] 4,136,655

[45] Jan. 30, 1979

[54] FUEL METERING VALVE WITH INLET METERING CONTROL

[75] Inventor: Werner G. Mannhardt, Detroit, Mich.

[73] Assignee: Eaton Corporation, Cleveland, Ohio

[21] Appl. No.: 811,002

[22] Filed: Jun. 29, 1977

[51] Int. Cl.[2] .................... F02M 41/00; F16K 31/44

[52] U.S. Cl. .................... 123/139 AP; 123/139 AD; 123/139 AR; 123/139 BE; 123/139 BC; 137/625.69; 251/263

[58] Field of Search ....... 123/32 G, 139 AP, 139 AQ, 123/139 AR, 139 AD, 139 BC, 139 BE; 137/625.13, 625.15, 625.68, 625.69; 251/263

[56] References Cited

U.S. PATENT DOCUMENTS

| | | | |
|---|---|---|---|
| 2,225,019 | 12/1940 | Retel | 123/139 AR |
| 2,396,602 | 3/1946 | Posch | 123/139 AP |
| 3,348,488 | 10/1967 | Wolff | 123/32 G |
| 3,827,832 | 8/1974 | Faupel et al. | 123/139 AD |
| 3,906,916 | 9/1975 | Laufer | 123/139 AP |
| 4,033,301 | 7/1977 | Walton | 123/32 G |
| 4,033,314 | 7/1977 | Walton | 123/139 R |
| 4,064,845 | 10/1975 | Bart | 123/139 AP |

*Primary Examiner*—Charles J. Myhre
*Assistant Examiner*—P. S. Lall
*Attorney, Agent, or Firm*—P. Rulon

[57] ABSTRACT

Metering valves in diesel engine fuel injection systems are disclosed. The systems each include a high pressure fuel pump, a fuel distributor, at least one metering valve, and fuel injector nozzles. In the preferred embodiment, the valves are of a type having a spool or valving member which moves axially in a bore from a second position to a first position and while so moving an annular groove, defined in the circumferential surface of the spool, traverses a valve outlet passage at velocities independent of engine speed for metering fuel to the engine during the traversing time. The spool may be moved from the second position to the first position by a spring or a solenoid and in the reverse direction by a stepped cam, a spring, or a solenoid. The distributor blocks fuel metering to the engine during reverse movement of the spool. The spool includes a pair of triangular cavities which continuously communicate with the groove and which control the amount of fuel metered for each traversing by moving out of communication with a pair of valve inlet passage openings at a variable point during each traversing of the outlet passage by the groove. The point is varied by changing the angular position of the spool in the bore as a function of throttle position.

28 Claims, 4 Drawing Figures

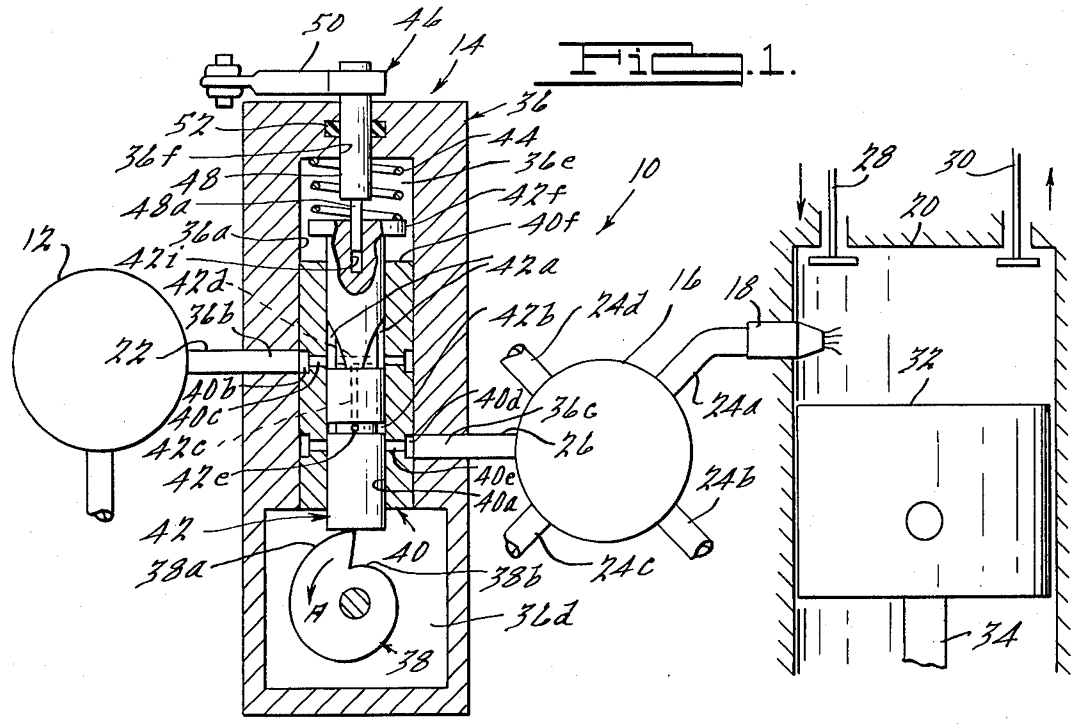
FIG. 1.
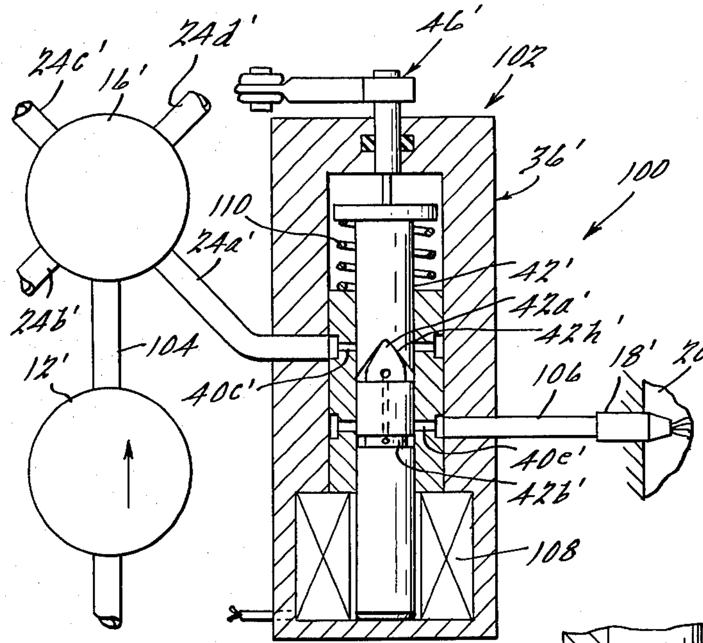
FIG. 2.
FIG. 3.
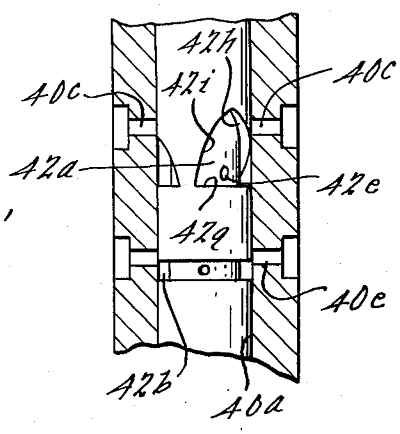
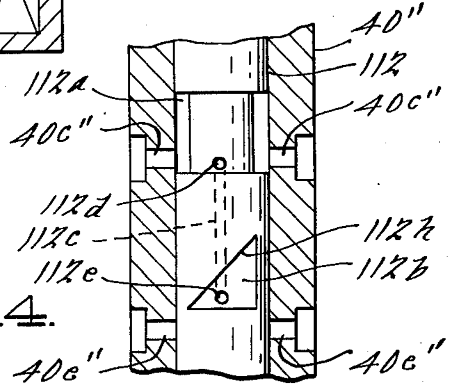
FIG. 4.

FUEL METERING VALVE WITH INLET METERING CONTROL

CROSS-REFERENCE

This application is related to copending U.S. applications Ser. Nos. 603,078; 609,884; 625,411; 689,327; and 689,391 which are assigned to the assignee of this application.

BACKGROUND OF THE INVENTION

1. Field of the Invention

This invention relates to a metering valve for a fuel injection system and more specifically to an improved metering arrangement of such a valve.

2. Description of the Prior Art

Several different basic types of fuel injection systems have been devised. The most successful of the basic types have been the common rail system and the jerk pump system. Many variations and combinations of the basic systems have also been devised. The basic common rail system employs a single pump for providing high pressure fuel to a manifold and plurality of metering valves connected to the manifold. The rate of fuel metering in such systems may be constant or vary as a function of time even though the pump may provide a relatively constant pressure to the manifold and the metering valves. The basic jerk pump system employs one or more jerk pumps which provide both the injection pressure and the metering. The rate of fuel injection in such systems varies greatly with respect to time due to rpm variations of the engine crankshaft. Hence, the pressure varies greatly with respect to engine speed.

During the past several years, common rail systems have had decreasing success with compression ignition engines operating over a wide speed and load range. Compression ignition engines require high injection pressure. Several known types of metering valves capable of accurately metering high pressure fuel have required actuating forces which are relatively high and synchronized. Engine driven actuating mechanisms provided both. Such mechanisms also operate the valving members at speeds proportional to engine speed, i.e., increasing engine speeds causes increasing valving member speeds with respect to time, and have used rather complicated and costly metering arrangements to maintain and/or increase the quantity of fuel metered due to changing engine speeds and loads. Further, several of these prior art metering arrangements have employed means to vary the size of the metering passage or orifice through the metering valve to control the quantity of fuel metered, thereby varying the pressure drop across the valve member and reducing the pressure of the metered fuel at light engine loads.

Injection systems employing jerk pumps, which often combine pumping and metering into a single unit, have had a high degree of success with diesel engines. Such systems may have one combined unit supplying several engine cylinders via a distributor or one unit per engine cylinder. In either case, the unit often includes a piston and a bore defining a chamber which is expanded and contracted in response to reciprocating movement of the piston. The piston is reciprocated by an engine driven device, such as a cam, at speeds proportional to engine speeds. A variable volume of fuel is trapped in the expanded chamber and them impulsively pushed to an engine cylinder in response to the piston moving in a direction contracting the chamber. Such units have several disadvantages; High forces are required to raise the trapped fuel volume to the high injection pressures required for a diesel engine. The drive train between the piston and the engine must be designed to withstand high torques. If variable injection timing is required, the drive train must include a sturdy phase change mechanism capable of withstanding the high torques. The high driving forces cause side loading of the piston, thereby accelerating wear of the piston and the bore. Injection pressures are lower than ideal at low engine speeds and higher than ideal at high engine speeds, since the piston speeds are proportional to engine speeds. Leakage of fuel from the trapped volume increases with decreasing engine speed. And rise and fall of the injection pressure is rather slow due to the cyclic pumping of the fuel by the piston.

The mentioned copending patent applications disclose improved metering valves for high pressure, common rail fuel injection systems. These metering valves all employ valving members which require relatively low actuating forces, which momentarily define a continuous passage through the valve, and which define the continuous passage for a period of time independent of engine speed. In the metering valves of application Ser. No. 689,327, the engine throttle controls a sleeve for varying the cross-sectional area of the continuous passage through the valve; this method of controlling the amount of fuel metered adds cost and complexity to the valve and more importantly varies the pressure drop across the valve, thereby undesirably varying the pressure of the metered fuel at the valve outlet and to the engine injector nozzle. In the metering valve of applications Ser. Nos. 603,078 and 625,411, the throttle rotates or varies the angular position of the valving member in its bore to control a dump means which connects the valve output to a return at varying points while the continuous passage is defined, thereby dumping the outlet pressure to terminate fuel flow to the nozzle but also spilling fuel flowing through the continuous passage to the return. This dump method has proven to be very effective in controlling the amount of fuel metered to the engine and in sharply dropping fuel pressure to the nozzle to negate nozzle dribble; however, it has disadvantages in some applications since it also causes an increase in the amount of fuel provided by the high pressure pump and causes pressure fluctuations to the inlets of other metering valves supplied by the manifold.

SUMMARY OF THE INVENTION

An object of this invention is to provide a simple, low cost, and durable metering valve.

Another object is to provide a metering valve which is readily controlled to vary the volume or amount of each fluid charge metered by the valve.

Another object is to provide a metering valve having a substantially constant pressure drop independent of the amount of each fluid charge metered by the valve.

According to a feature of this invention, the metering valve includes a valve housing having a cylindrical bore and fluid inlet and outlet openings communicating with the bore, a valving member disposed for axial movement between two positions in the bore, and metering means operative to intercommunicate the openings and momentarily define a continuous passage through the valve housing while the valve member moves between the two positions, and a metering passage defined by the metering means and presenting to one of the openings during such movement a passage which varies in length in the direction of axial movement in response to means varying the angular position of the valving member in the bore.

According to another feature of the invention, the metering valve as defined above is disposed in a fuel injection system including a source of pressurized fuel, a nozzle for delivering metered fuel to an engine, and a distributor operative to block or prevent fuel metering to the engine when the valving member moves in one direction between the two positions an unblock or allow fuel metering to the engine when the valve moves in the other direction between the two positions.

BRIEF DESCRIPTION OF THE DRAWING

The preferred embodiments of the invention are shown in the accompanying drawing in which:

FIG. 1 is a schematic view of a fuel injection system having one valve for metering fuel to a plurality of engine cylinders;

FIG. 2 is a schematic view of a fuel injection system having one valve for metering fuel to a single engine cylinder;

FIG. 3 is a fragmentary view of the valving member in the metering valves of FIGS. 1 and 2; and FIG. 4 is a fragmentary view of a modified form of the valving member.

DETAILED DESCRIPTION OF THE PREFERRED EMBODIMENT

FIG. 1 is a schematic view of a fuel injection system 10 having a high pressure fuel pump 12, a fuel metering valve 14, a fuel distributor 16, and one of a plurality of fuel injector nozzles 18 for each of a plurality of cylinders 20 of a diesel engine. Metering valve 14 is enlarged relative to several other components in the system 10 to more clearly show details of the valve.

Pump 12, distributor 16, nozzles 18, and cylinders 20 may be any of several types well known in the art. Pump 12 is preferably, but not necessarily, engine drive and supplies high pressure fuel to the valve inlet via a tube 22. The fuel pressure supplied by pump 12 may be in the order of 4,000 to 10,000 p.s.i. The term high pressure, as used herein, distinguishes the high pressure required for fuel injection directly into an engine cylinder over the relatively low pressure required for fuel injection into an engine manifold. However, valve 14 may be used with a lower pressure for engine manifold injection or other kinds of injection.

Distributor 16 may be of the well known type having a fixed disc with a plurality of fuel outlet ports connected to tubes **24*a*, 24*b*, 24*c*, and 24*d* and a rotating disc with a single port which is in constant communication with a high pressure fuel outlet from the metering valve via a line 26. The rotating disc is driven at camshaft speed and is preferably driven by the engine. The single port traverses the outlet ports and pressurizes the tubes 24 in the engine firing order. Tubes 24 are each connected to an injector nozzle 18 which injects directly into one of the cylinders 20. The specific type of pump, distributor, and nozzles form no part of the present invention. Cylinders 20 include inlet and outlet valves 28 and 30 and a piston 32 which is connected to the engine crankshaft via a connecting rod 34**.

Herein, valve 14 provides metered fuel for four engine cylinders. However, valve 14 can easily provide metered fuel for a lesser number of cylinders and can provide fuel for a greater number as long as the response time of the valve is made compatible with the cyclic speed of the engine.

Metering valve 14 includes a housing 36, a stepped cam 38, a sleeve 40, a spool or valving member 42, a helical spring 44, and a valve rotating mechanism 46. Housing 36 includes a bore **36*a*, an inlet port 36*b* communicating tube 22 with the bore, an outlet port 36*c* communicating the bore with tube 26, a cam chamber 36*d*, and a spring chamber 36*e* formed as an extension of bore 36*a*. Chambers 36*d* and 36*e*** are preferably provided with drain passages to prevent the accumulation of fuel therein.

Stepped cam 38 includes a radially extending lobe or crest portion **38*a* which smoothly increases to a maximum height in the direction of cam rotation, as shown by arrow A, and then abruptly decreases in step fashion to a minimum height portion 38*b*. Cam 38 is driven in a timed relation with distributor 16 at engine camshaft speed and is preferably driven by the engine. Stepped cam 38 may also be of the axially facing type, in which case the rotational axis of the cam would be rotated 90 degrees and the crest 38*a*** would extend outward in the direction of the rotational axis; such a cam is disclosed in the before mentioned U.S. patent application, Ser. No. 625,411.

Cam 38 may be driven in any of several well known ways. When engine driven, the angular phase relation or timing between cam 38 and the engine crankshaft or camshaft may be varied by a phase change device to optimize engine performance. Examples of such devices are disclosed in U.S. Pat. No. 3,837,413 and in the before mentioned U.S. patent application Ser. No. 625,411.

Sleeve 40 is pressed or otherwise firmly secured in bore **36*a* and includes a cylindrical bore 40*a* which communicates with inlet port 36*b* via an annular passage 40*b* and a pair of inlet passages 40*c* which open in the cylindrical surface or bore 40*a* with equal and diametrically opposed areas to negate side loading of spool 42 due to fluid pressure. Bore 40*a* also communicates with outlet port 36*c* via an annular passage 40*d* and four oulet passages 40*e* which open in the cylindrical surface of bore 40*a* with equal and symmetrically opposed areas to negate side loading of spool 42 due to fluid pressure. In the valve embodiment of FIGS. 1 and 2, the openings of outlet ports 40*e* may be ganged together by machining an annular passage into the surface of bore 40*a***.

Spool 42 is disposed for sliding-sealing contact with the cylindrical wall of bore **40*a* and includes metering means which cooperates with the inlet and outlet openings of passages of 40*c* and 40*e* to momentarily define a continuous passage through the valve housing as the spool moves from a second position, as shown in FIG. 1, to a first position, as shown in FIG. 2. The metering means includes a pair of diametrically opposed triangular cavities or metering passages 42*a* formed in the circumferential surface of the spool, an annular groove 42*b* also formed in the circumferential surface, and a passage 42*c* extending along the longitudinal axis of the spool for continuously communicating the cavities with the annular groove via symmetrically disposed and radially extending passages 42*d* and 42*e*. A flange portion 42*f* provides a bearing surface for spring 44 and a stop which engages a shoulder 40*f* of sleeve 40 for limiting downward movement of the spool to prevent the spool end in sliding contact with the stepped cam from clashing against the minimum height portion of the cam when the spring moves the spool from a second position, as shown in FIG. 1, to a first position. Cavities 42*a*, as more clearly shown in FIGS. 2 and 3, are each formed with equal and diametrically opposed opening areas in the circumferential surface of the spool to negate side loading of the spool due to fluid pressure. The opening area of each cavity, as numbered in FIG. 3, defines an isosceles triangle formed by a base or transverse shoulder 42*g* and a pair of equal sides or oblique shoulders 42*h* and 42*i*. Oblique shoulders 42*h* and 42*i* cooperate with the openings of inlet passages 40*c* to control the amount of metered fuel as a function of the angular position of the spool in bore 40*a*. For any given installation of valve 14 in an injection system, only one of the oblique shoulders 42*h*, 42*i* of each cavity 42*a*** is operative to control the amount of fuel metered. By providing each cavity with two oblique shoulders, each spool may be setup for either clockwise or counterclockwise rotation to control fuel metering.

In FIGS. 1 and 2, spool 42 is shown rotated beyond its maximum limits to more clearly illustrate the shape of cavities **42*a*. During actual valve operation, each cavity 42*a* communicates with one of the openings when the spool is in its upward or second position and presents a metering passage to the opening which varies in length as the angular position of the spool is varied in response to changes in throttle position. For example, when shoulder 42*h* is utilized and no fuel is to be metered, the angular position of the spool will be such that each inlet passage 40*c* will open into the lower right hand corner of its respective cavity and shoulder 42*h* will pass over the opening before annular groove 42*b* communicates with the outlet passage openings 40*e* as the spool moves downward toward its first position. When a maximum fuel charge is to be metered, the angular position of the spool will be such that each of the inlet passages 40*c* will open into its respective cavity at a position slightly to the right of the vertical center of the cavity and shoulder 42*h* will pass over the inlet opening just as annular groove 42*b* moves out of communication with outlet passage openings 40*e* as the spool moves toward its first position. Spool 42 is shown in an intermediate angular position in FIG. 3**.

Valve 14 meters fuel to its outlet port at a relatively constant rate and pressure independent of the amount of fuel in each charge, since the continuous passage, defined through the valve during spool movement from the second to the first position, is not varied in effective area or orifice size to control the amount of fuel in each charge, but is rather defined for shorter or longer periods of time by varying the length of the metering passage or cavities **42*a*** independent of the effective area.

Spool rotating mechanism 46 includes a shaft 48 extending through an opening **36*f* in housing 36, a flat sided tang portion 48*a* extending downward from the shaft and slidably received in a flat sided opening 42*i* in spool 42, a crankarm 50 secured to shaft 48 and operative to rotate or vary the angular position of the spool in bore 40*a* in response to throttle movement, and a seal 52 to prevent leakage along shaft 48. Shaft 48 may be secured against axial movement in opening 36*f* in any of several well known ways. The use of crankarm 50 is merely illustrative of one means for rotating shaft 48** in response to throttle movement. In many installations, the crankarm would probably be replaced by a rack and pinion as is well known in the fuel injection art.

In the operation of system 10, cam 38 rotates in the direction of arrow A and crest **38*a* moves spool 42 axially upward in bore 40*a* from the first position to the second position at speeds proportional to engine speed. Spool 42 is shown in the second position in FIG. 1 and in the first position in FIG. 2. As spool 42 moves upward, cavities 42*a* register with passages 40*c*, inlet passage openings 40*c* charge cavities 42*a* and groove 42*b* with high pressure fuel from pump 12, and groove 42*b* moves from a position below and blocked from communication with outlet passage openings 40*e* when the spool is in the first position to a position above and also blocked from communication with outlet passage openings 40*e* when the spool reaches the second position. During spool movement to the second position, groove 42*b* traverses outlet passage openings 40*e* and distributor 16, which is driven in timed relation with cam 38, blocks fuel communication to nozzles 18 to prevent fuel metering to the engine. When crest 38*a* passes spool 42, spring 44 abruptly moves the spool back to the first position at velocities proportional to the force of spring 44 and therefore at velocities independent of engine speed and load and independent of the rotational speed of the cam. During the return movement of the spool to the first position, distributor 16** unblocks and allows fuel metering to one of the nozzles for a period of time solely dependent on the angular position of the spool in the bore and on the axial velocity of the spool in the bore.

The angular position is of course readily controlled by the throttle. The axial velocity depends on the spring force. However, the velocity may be adversely effected by side loading of the spool; hence, the previous mentioned need for negating side loading of the spool due to fluid pressure should be obvious. This need may be minimized or ignored if the spool is positively driven from the second position to the first position.

FIG. 2 schematically illustrates a second injection system embodiment 100 and a second metering valve embodiment 102. The principal difference between systems 10 and 100 is the number of metering valves required for a multicylinder engine and the means for moving the spool in the metering valve. System 10 employs one metering valve for a plurality of cylinders, whereas system 100 employs one metering valve for each cylinder. With the exception of valves 14 and 102, components of the two systems differ only with respect to their position in the systems. Like components for the two systems are designated by the same numerals with those in FIG. 2 followed by a prime.

Injection system 100 includes a pump 12' connected to a distributor 16' via a tube 104, the metering valve 102 connected at its inlet port to a tube **24*a*' and injector nozzle 18' connected to the outlet port of the valve via a tube 106. Nozzle 18' injects directly into a cylinder 20' and tubes 24*b*, 24*c*, and 24*d* connect to additional valves 102**.

Metering valve 102 differs from valve 14 principally with respect to the means for actuating the spool therein. Spool 42' is pulled downward to its first position, as shown, by a solenoid 108 and upward to its second position by a spring 110. Solenoid 108 may be energized to pull the spool downward to its first position by any of several well known systems for energizing solenoids in a timed relation with an engine.

In the system of FIG. 2, spring 110 replaces cam 38 and provides the motive force for moving spool 42' from the first position to the second position and solenoid 108 replaces spring 44 for abruptly moving spool 42' from the second position to the first position at speeds independent of engine speed. Spool 42' is shown in the first position in FIG. 2. Distributor 16' blocks the flow of high pressure fuel to the inlet port of valve 102 during spool movement to the second position by spring 110, thereby preventing fuel metering to the engine, and allows the flow of high pressure fuel to the inlet port during the spool movement to the first position, thereby allowing fuel metering to the engine. As in FIG. 1, the amount of each fuel charge metered to the engine via nozzles 20' is determined by the angular position of the spool in the bore and the angular position is controlled by throttle position.

In a manner analogous to that of FIG. 1, the timing of fuel metering to the engine may be varied to optimize engine performance.

FIG. 4 discloses a fragmentary view of a spool or valving member 112 which may be used in lieu of spool 42 or 42'. Spool 112 is disposed for axial sliding-sealing movement and rotation in the bore of a sleeve 40'' in the same manner as spools 42 and 42'. Sleeve 40'' is substantially identical to sleeves 40 and 40' and includes a pair of inlet passages **40*c*'' and a pair of outlet passages 40*e*'' which perform the same function as their like numbered passages in FIGS. 1-3. Spool 112 is shown in its second axial position and rotated beyond its angular limits to better illustrate the shape of its triangular cavity. The spool includes an annular groove 112*a* which registers with the inlet passages and a pair of diametrically opposed triangular cavities 112*b*. Cavities communicate with groove 112*a* via passages 112*c*, 112*d*, and 112*e* and traverse passages 40*e*'' in a manner analogous to the traversing of passages 40*c* by cavities 42*a* in FIGS. 1-3**.

Triangular cavities **112*b*, unlike cavities 42*a*, are configured to include only one oblique shoulder 112*h* for controlling the amount of fuel metered as a function of the angular position of the spool in the bore. This configuration allows the slope of shoulder 112*h* to be decreased, thereby decreasing the fuel metering sensitivity as a function of the angular position of the spool in the bore. This configuration may be used in valves 14 and 102** wherein the spool is moved through its metering stroke at speeds independent of engine speeds or in valves wherein the spool is positively driven by a cam through its metering stroke at speeds proportional to engine speeds.

In an unshown modification of the sleeve and spool, the sleeve is provided with one inlet passage opening diametrically opposed one outlet passage opening, one cylindrical side of the spool is provided with a partial groove similar to groove **112*a* but extending only about 130 degrees around the spool, and the other cylindrical side of the spool is provided with one triangular cavity which communicates with the partial groove via a transverse passage. In this modified form, the groove registers with the inlet passage in a manner analogous to the way groove 112*a* registers with inlet ports 40*c*'' and the triangular cavity traverses the outlet passage in a manner analogous to the way cavities 112*b* traverse passages 40*d*''**. However, static fluid pressure or flow forces may side load the spool when this modified form is used, thereby adversely effecting spool velocity and requiring a positive drive means for the spool.

Two injection system embodiments and two metering valve embodiments with modifications thereto have been disclosed for illustrative purposes. Many variations are believed to be within the spirit of the inventive concepts in the disclosed embodiments. For example, metering valves 14 and 102 may be used in either of the two systems, valve 102 may easily be modified to provide spool movement to the first position by solenoid 108 and return movement to the second position by spring 110, and spool 112 of FIG. 4 or its mentioned variation may be used in either valve. The following claims are intended to cover the inventive portions of the disclosed embodiments and variations and modifications within the spirit of the invention.

What is claimed is:

1. In a fluid metering valve including a valve housing having a cylindrical bore and fluid inlet and outlet opening means communicating with said bore, a valving member axially moveable a given distance in said bore between first and second positions and having a circumferential surface in sliding-sealing contact with the cylindrical wall of said bore for blocking communication between said opening means when said valving member is in said first and second positions, means for moving said valving member axially in said bore between said first and second positions, and means for varying the angular position of said valving member in said bore, wherein the improvement comprises:

metering means defined by said valving member and operative in response to axial movement of said valving member from said second position to said first position to intercommunicate said inlet and outlet opening means for a portion of said given distance and define a continuous passage through said valve housing, said metering means operative in response to variations in the angular position of said valving member in said bore to vary said portion of said given distance that defines said continuous passage through said valve housing for controlling the amount of fluid metered to said outlet opening means independent of the axial velocity of said valving member.

2. The metering valve of claim 1, wherein said means for moving said valving member axially in said bore includes:

means for effecting each axial movement of said valving member from said second position to said first position at substantially the same velocities, whereby variation in said angular position of said valving member varies the period of time said continuous passage is defined.

3. The metering valve of claim 1, wherein said metering means includes:

cavity means defined in the circumferential surface of said valving member and presenting a metering passage of variable length to said opening means in the direction of axial movement of said valving member in response to variations in the angular position of said valving member for controlling said portion of said given distance said continuous passage is defined while said valving member moves from said second position to said first position.

4. The metering valve of claim 3, wherein said cavity communicates with said inlet passage means while said valving member is in said second position and wherein said metering means further includes:

a traversing passage continuously communicating with said cavity, blocked for communication with said outlet passage while said valving member is in said first and second positions, and operative to traverse said outlet opening means while said valving member moves from said second position to said first position for defining said continuous passage while said cavity is in communication with said inlet opening means.

5. The metering valve of claim 1, wherein said means for moving said valving member includes:

cam means operative to move said valving member from said first position to said second position in response to relative movement between said cam means and said valving member and at velocities proportional to the velocity of said relative movement; and means operative to move said valving member from said second position to said first position at velocities independent of the velocity of said relative movement.

6. The metering valve of claim 5, wherein said means operative to move said valving member from said second position to said first position is a spring.

7. The metering valve of claim 1, wherein said means for moving said valving member includes:

stepped cam means having a crest which smoothly increases to a maximum height for moving said spool from said first position to said second position in response to relative movement between said cam means and said valving member and then abruptly decreases to a lower height; and resilient means operative to move said valving member from said second position to said first position at velocities independent of the velocity of said relative movement.

8. The metering valve of claim 1, wherein said inlet opening means includes a plurality of such openings in the surface of said bore and said metering means includes:

a plurality of cavity means defined in and symmetrically disposed about the circumferential surface of said valving member, each of said cavities presenting a metering passage of variable length to at least one of said inlet openings in the direction of axial movement of said valving member in response to variations in the angular position of said valving member, and each of said cavities communicating with said at least one inlet opening when said valving member is in said second position; and a traversing passage continuously communicating with said cavities, said traversing passage blocked from communication with said outlet opening means while said valving member is in said first and second positions and operative to traverse said outlet opening means while said valving member moves from said second position to said first position for defining said continuous passage while said cavities communicate with said inlet openings.

9. The metering valve of claim 8, wherein said cavity means have equal opening areas in the circumferential surface of said valving member for negating side loading of said valving member due to fluid pressure and said traversing passage is an annular cavity defined in the circumferential surface of said valving member.

10. The metering valve of claim 9, wherein said means for moving said valving member axially in said bore includes:

means for effecting each axial movement of said valving member from said second position to said first position at substantially the same velocities.

11. The metering valve of claim 9, wherein said means for moving said valving member includes:

stepped cam means having a crest which smoothly increases to a maximum height for moving said spool from said first position to said second position in response to relative movement between said cam means and said valving member and then abruptly decreases to a lower height; and resilient means operative to move said valving member from said second position to said first position at velocities independent of the velocity of said relative movement.

12. The metering valve of claim 9, wherein said means for moving said valving member includes:

solenoid means operative when energized to move said valving member axially from said second position to said first position; and resilient means operative when said solenoid means is deenergized to move said valving member axially from said first position to said second position.

13. The metering valve of claim 1, wherein said outlet opening means includes a plurality of outlet openings symmetrically disposed about said bore and said metering means includes:

a plurality of cavity means defined in and symmetrically disposed about the circumferential surface of said valving member, said cavities each blocked from communication with said outlet openings while said valving member is in said first and second positions, said cavities each operative to traverse and communicate with at least one of said outlet openings while said valving member moves axially from said second position to said first position, and each of said cavities presenting a metering passage of variable length to said at least one outlet opening during axial movement of said valving member from said second position to said first position in response to variations in the angular position of said valving member in said bore; and an annular groove defined in the circumferential surface of said valving member, and in constant communication with said cavities, said groove operative to communicate with said inlet opening means prior to the start of said traversing and operative to remain in communication with said inlet opening means while said cavities are traversing said outlet openings, whereby a continuous passage through said valve housing is defined during said traversing.

14. The metering valve of claim 13, wherein said cavity means have equal opening areas in the circumferential surface of said valving member for negating side loading of said valving member due to fluid pressure.

15. The metering valve of claim 14, wherein said means for moving said valving member axially in said bore includes:

means for effecting each axial movement of said valving member from said second position to said first position at substantially the same velocities.

16. The metering valve of claim 14, wherein said means for moving said valving member includes:

stepped cam means having a crest which smoothly increases to a maximum height for moving said spool from said first position to said second position in response to relative movement between said cam means and said valving member and then abruptly decreases to a lower height; and resilient means operative to move said valving member from said second position to said first position at velocities independent of the velocity of the relative movement.

17. The metering valve of claim 14, wherein said means for moving said valving member includes:

solenoid means operative when energized to move said valving member axially from said second position to said first position; and resilient means operative when said solenoid means is deenergized to move said valving member axially from said first position to said second position.

18. In a fuel injection system of the type including a source of pressurized liquid fuel; a nozzle for delivering the fuel to a piston cylinder of an internal combustion engine having a throttle; passage means for communicating the source with the nozzle; means for periodically blocking and unblocking the passage means; a metering valve including a valve housing having a cylindrical bore and fluid inlet and outlet means, respectively, connected to said source and said nozzle and each including opening means communicating with said bore, a valving member axially moveable a given distance in said bore between first and second positions and having circumferential surface in sliding-sealing contact with the cylindrical wall of said bore for blocking communication between said opening means when said valving member is in said first and second positions, means for moving said valving member axially in said bore between said first and second positions, and means for varying the angular position of said valving member in said bore in response to movement of the throttle; wherein the improvement comprises:

metering means defined by said valving member and operative in response to axial movement of said valving member from said second position to said first position to intercommunicate said inlet and outlet opening means for a portion of said given distance that defines a continuous passage through said valve housing, and said metering means operative in response to variations in the angular position of said valving member in said bore to vary said portion of said given distance that defines said continuous passage through said valve housing for controlling the amount of fluid metered to said outlet opening means independent of the axial velocity of said valving member.

19. The metering valve of claim 18, wherein said inlet opening means includes a plurality of openings in the surface of said bore and said metering means includes:

a plurality of cavity means defined in and symmetrically disposed about the circumferential surface of said valving member, each of said cavities presenting a metering passage of variable length to at least one of said inlet openings in the direction of axial movement of said valving member in response to variations in the angular position of said valving member, and each of said cavities communicating with said at least one inlet opening when said valving member is in said second position; and a traversing passage continuously communicating with said cavities, said traversing passage blocked from communication with said outlet opening means while said valving member is in said first and second positions and operative to traverse said outlet opening means while said valving member moves from said second position to said first position for defining said continuous passage while said cavities communcate with said inlet opening means.

20. The metering valve of claim 19, wherein said cavity means have equal opening areas in the circumferential surface of said valving member for negating side loading of said valving member due to fluid pressure.

21. The metering valve of claim 20, wherein said means for moving said valving member axially in said bore includes:

means for effecting each axial movement of said valving member from said second position to said first position at substantially the same speeds.

22. The metering valve of claim 20, wherein said means for moving said valving member includes:

stepped cam means having a crest which smoothly increases to a maximum height for moving said spool from said first position to said second position in response to relative movement between said cam means and said valving member and then abruptly decreases to a lower height; and resilient means operative to move said valving member from said second position to said first position at speeds independent of the speed of said relative movement.

23. The metering valve of claim 20, wherein said means for moving said valving member includes:

solenoid means operative when energized to move said valving member axially from said second position to said first position; and resilient means operative, when said solenoid means is deenergized, to move said valving member axially from said first position to said second position.

24. The metering valve of claim 18, wherein said outlet opening means includes a plurality of outlet openings symmetrically disposed about said bore and said metering means includes:

a plurality of cavity means defined in and symmetrically disposed about the circumferential surface of said valving member, said cavities each blocked from communication with said outlet openings while said valving member is in said first and second positions, said cavities each operative to traverse and communicate with at least one of said outlet openings while said valving member moves axially from said second position to said first position, and each of said cavities presenting a metering passage of variable length to said at least one outlet opening during axial movement of said valving member from said second position to said first position in response to variations in the angular position of said valving member in said bore; and an annular groove defined in the circumferential surface of said valving member, and in constant communication with said cavities, said groove operative to communicate with said inlet opening means prior to the start of said traversing and operative to remain in communication with said inlet opening means while said cavities are traversing said outlet openings, whereby a continuous passage through said valve housing is defined during said traversing.

25. The metering valve of claim 24, wherein said cavity means have equal opening areas in the circumferential surface of said valving member for negating side loading of said valving member due to fluid pressure.

26. The metering valve of claim 25, wherein said means for moving said valving member axially in said bore includes:

means for effecting each axial movement of said valving member from said second position to said first position at substantially the same velocities.

27. The metering valve of claim 25, wherein said means for moving said valving member includes:

stepped cam means having a crest which smoothly increases to a maximum height for moving said spool from said first position to said second position in response to relative movement between said cam means and said valving member and then abruptly decreases to a lower height; and resilient means operative to move said valving member from said second position to said first position at velocities independent of the velocity of said relative movement.

28. The metering valve of claim 25, wherein said means for moving said valving member includes:

solenoid means operative when energized to move said valving member axially from said second position to said first position; and resilient means operative when said solenoid means is deenergized to move said valving member axially from said first position to said second position.

* * * * *